United States Patent
Palviainen

(10) Patent No.: US 6,978,134 B1
(45) Date of Patent: Dec. 20, 2005

(54) CALL ROUTING

(75) Inventor: Keijo Lauri Palviainen, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/869,001

(22) PCT Filed: Dec. 21, 1999

(86) PCT No.: PCT/FI99/01063

§ 371 (c)(1),
(2), (4) Date: Jun. 21, 2001

(87) PCT Pub. No.: WO00/38461

PCT Pub. Date: Jun. 29, 2000

(30) Foreign Application Priority Data

Dec. 21, 1998 (FI) .................................. 982762

(51) Int. Cl.[7] .......................... H04Q 7/20; H04Q 7/38
(52) U.S. Cl. ................ 455/433; 455/417; 455/414.1; 455/414.4; 455/445; 455/422.1; 379/211.01; 379/211.02
(58) Field of Search ................ 455/432.1, 432.3, 455/433, 445, 422.1, 551, 550.1, 426.1, 426.2, 455/432.2, 403, 412.1, 412.2, 414.1, 414.3, 455/414.4, 417, 415, 555, 567, 413, 500, 455/517, 554.1, 554.2; 379/211.01, 211.02

(56) References Cited

FOREIGN PATENT DOCUMENTS

| DE | 195 15 558 | 9/1996 |
|---|---|---|
| FI | 101183 | 2/1997 |
| FI | 101119 | 5/1997 |
| FI | 103168 | 12/1997 |
| WO | WO 97/07643 | 2/1997 |
| WO | WO 97/08912 | 3/1997 |
| WO | WO 97/17816 | 5/1997 |
| WO | WO 97/36450 | 10/1997 |
| WO | WO 97/46031 | 12/1997 |
| WO | WO 99/01004 | 1/1999 |
| WO | WO 99/33300 | 7/1999 |

OTHER PUBLICATIONS

Copy of International Search Report for PCT/FI99/01063.

*Primary Examiner*—Keith Ferguson
(74) *Attorney, Agent, or Firm*—Squire, Sanders & Dempsey L.L.P.

(57) ABSTRACT

A mobile communication system includes at least one subscriber database containing subscriber data and exchanges connected to each other by communication paths. At least one of the exchanges includes means for transmitting a request to the subscriber database. The request includes at least a B-subscriber number to a terminating call. To provide a system that is capable of selecting the optimum communication path for a terminating call, the subscriber database includes means for retrieving and transmitting to an exchange, a basic service code that corresponds to the B-subscriber number included in the request. The exchange includes means for routing the terminating call to the B-subscriber number by using communication paths that fulfill the property requirements of the call type indicated by the basic service code.

9 Claims, 3 Drawing Sheets

| IMSI | MSISDN-1 | SC-1 | MSISDN-2 | SC-2 | ... | MSISDN-n | SC-n |

FIG. 3

Figure 1:
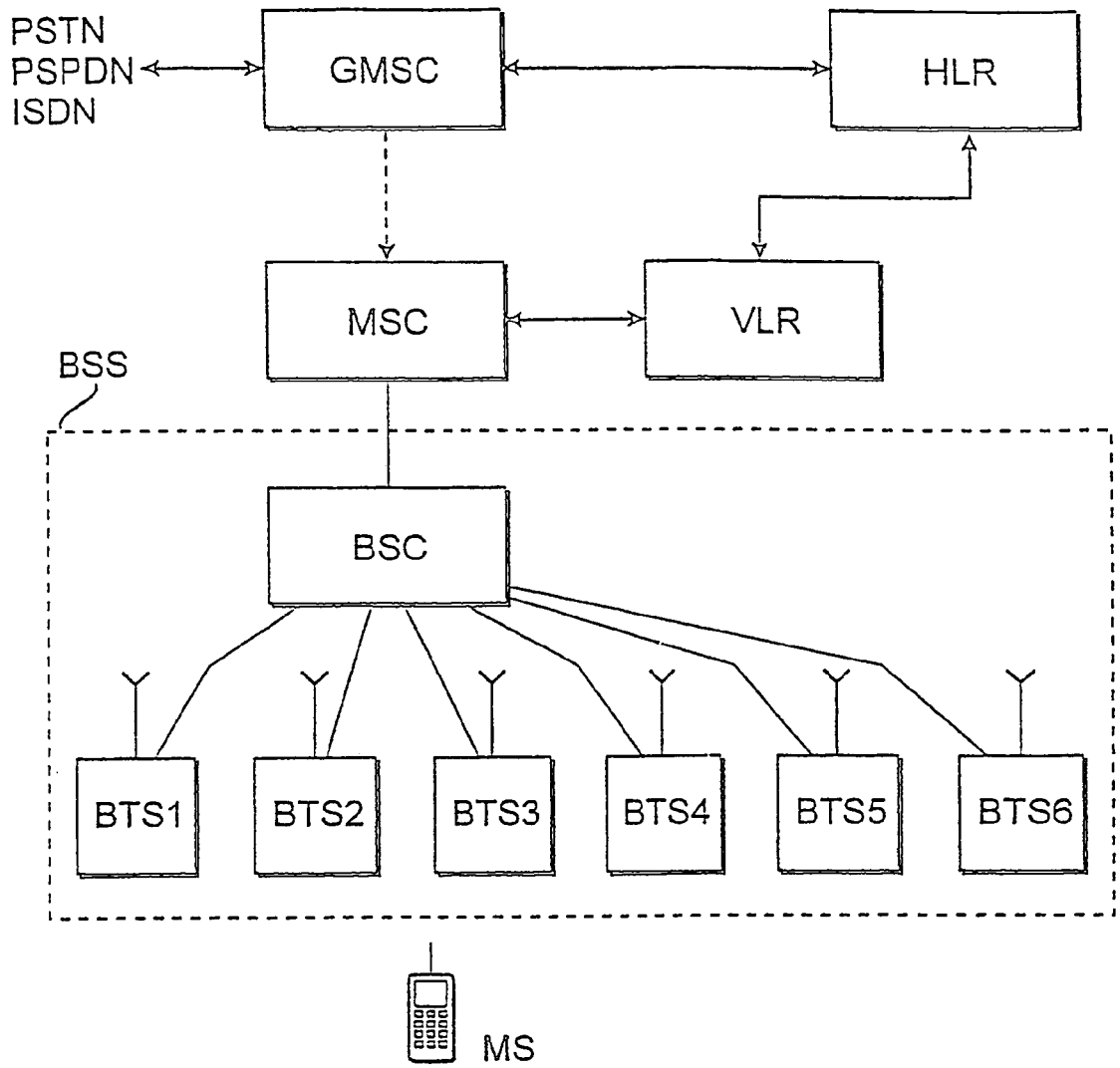

```
SendRoutingInfoResE ::= SEQUENCE (
imsi                            IMSI,
routingInfo                     RoutingInfo,
cug-CheckInfo                   CUG-CheckInfo        OPTIONAL,
pni                             PnpIndex             OPTIONAL,
sriResExtension   [PRIVATE 0]   SriResExtension      OPTIONAL,
ansiSriResExt     [PRIVATE 30]  ANSISriResExt        OPTIONAL
...)
```

```
SriResExtension ::= [PRIVATE 0] SEQUENCE (
inTriggerKey      [0]    InTriggerKey         OPTIONAL,
vlrNumber         [1]    ISDN-AddressString   OPTIONAL,
activeSs          [2]    ActiveSS-List        OPTIONAL,
traceReference    [3]    TraceReference       OPTIONAL,
traceType         [4]    TraceType            OPTIONAL,
omc-Id            [5]    AddressString        OPTIONAL,
hotBilling        [6]    BOOLEAN              OPTIONAL,
cfIsDone          [7]    BOOLEAN              OPTIONAL,
cfInCug           [8]    BOOLEAN              OPTIONAL,
basicService      [9]    BasicServiceCode     OPTIONAL,
category          [10]   Category             OPTIONAL,
routingCategory   [11]   RoutingCategory      OPTIONAL,
pnpIndex          [12]   PnpIndex             OPTIONAL,
nokia-CUG         [13]   Nokia-CUG-Data       OPTIONAL,
noBarrings        [14]   NULL                 OPTIONAL,
odb-Data          [15]   ODB-Data             OPTIONAL
...)
```

FIG. 4

CALL ROUTING

The present invention relates to telecommunication systems and especially to a solution for routing a mobile terminating call.

Modern mobile communication systems provide mobile stations with different data transmission properties in addition to conventional speech transmission. Mobile system services can be divided generally into teleservices and bearer services. A bearer service is a telecommunication service that constitutes the transmission of signals between user-network interfaces. For example modem services are bearer services. In a teleservice, the network also provides terminal services. Important teleservices in turn include speech, facsimile and videotex services.

One mobile subscriber may typically have access to different tele- and bearer services that are referred to in this connection as basic services. A subscriber may use for example a speech, facsimile and data service. A call terminating at or originating from a mobile station may therefore require any of these basic services, and therefore the correct service must be indicated to the mobile network. For example in a GSM mobile system, call set-up signaling transmitted by a mobile station contains data about the required basic service in a bearer capability information element (BCIE). In this manner, the mobile network is able to select the correct basic service for calls originating from the mobile station. Calls arriving from an Integrated Services Data Network (ISDN) also contain a corresponding information element that indicates the required service. However, if the call arrives from an analog Public Switched Telephone Network (PSTN) or travels through it, the mobile network does not receive such data concerning the service type of the call or the applicable Transmission Medium Requirement (TMR). In such a case, the mobile network should know in some other manner the type of the call in order to be able to route it on appropriate transmission paths.

A known solution to provide information about the call type is to use a multi numbering scheme, where a mobile subscriber has as many directory numbers as he has services to which he wants to receive incoming calls. The number is also called the mobile subscriber ISDN number, i.e. MSISDN. For example, a subscriber may have a number for a speech service, a facsimile service and a modem service. In a multi numbering scheme, the calling subscriber, in other words the A-subscriber, selects from the mobile subscriber's numbers the B-subscriber number corresponding to the desired service. This prior art solution makes it possible to provide information to the Home Location Register (HLR) of the called mobile station, in other words the B-subscriber, about the type of the terminating call. However, it is not sufficient that only the HLR register is informed about the call type but instead this information should be provided for the network elements that route the call to the B-subscribers. The problem with prior art solutions has been that the HLR register has not been able to provide the necessary information about the call type for the other network elements in such a way that also older existing exchanges would be able to utilize this information efficiently.

The object of the invention is to provide a solution which enables routing of a call in a mobile communication system in an optimal manner which takes into account the call type, and which requires as few modifications as possible to the existing network elements. These objects are achieved with a method of routing a terminating call in a mobile communication system comprising exchanges which are connected to each other by communication paths, and at least one subscriber database containing subscriber data, said method comprising: transmitting a request from a routing exchange to said subscriber database, said request including at least a B-subscriber number of said terminating call. The method of the present invention is characterized by retrieving a basic service code for said terminating call from said subscriber database on the basis of the B-subscriber number included in the request, transmitting a response from said subscriber database to said routing exchange, said response including at least said basic service code, and routing said terminating call from the routing exchange to said B-subscriber number by using communication paths that fulfill the property requirements of the call type indicated by said basic service code.

The present invention also relates to a mobile communication system in which the method of the present invention can be used. The mobile communication system of the invention comprises: at least one subscriber database containing subscriber data, and exchanges connected to each other by communication paths, at least one of said exchanges comprising means for transmitting a request to said subscriber database, said request including at least a B-subscriber number of a terminating call. The mobile communication system is characterized in that said subscriber database comprises means for retrieving and transmitting to said exchange a basic service code that corresponds to the B-subscriber number included in the request, and said exchange comprises means for routing said terminating call to the B-subscriber number by using communication paths that fulfill the property requirements of the call type indicated by said basic service code.

The invention also relates to an exchange of a mobile communication system which can be used in the mobile communication system of the present invention. The exchange according to the invention comprises: means for transmitting a request that includes at least a B-subscriber number of a terminating call, and routing means for routing said terminating call. The exchange of the present invention is characterized in that said exchange comprises means for receiving a basic service code, and that said routing means are responsive to the received basic service code for routing said terminating call to the B-subscriber number by using a communication path that fulfills the property requirements of the call type indicated by said basic service code.

The present invention is based on the idea that the exchange which is routing the call is provided with the basic service code of the terminating call. The basic service code indicates the type of the call, and thus the routing exchange is able to determine the properties, for instance quality or transmission speed, that are required by the terminating call. This makes it possible to select the communication paths with the appropriate properties when the call is routed to the B-subscriber number.

The most significant advantages of the present invention are thus that a terminating call from an analog network can be routed in an optimal manner in view of the call type, even though the analog network does not provide any information about the call type. The present invention makes it possible to provide the routing exchange with the basic service code that indicates the call type without any significant changes to existing standards, as this information can be transmitted from the subscriber database to the exchange for instance in a SendRoutinginfoResE message which in existing systems already is transmitted from the Home Location Register (HLR) to the routing exchange.

In a preferred embodiment of the exchange of the present invention, the exchange is provided with means for converting the Transmission Medium Requirement (TMR) of the terminating call according the call type indicated by the basic service code. Analog networks are not capable of indicating the correct TMR to the exchange of modern digital mobile communication systems. However, the exchanges of present mobile communication systems are capable of indicating the correct TMR to each other when the call is routed. Thus it is sufficient if the first exchange, in other words the Gateway Mobile Switching Centre, can make the necessary TMR conversion for the terminating call. The converted TMR is then forwarded to the other exchanges which participate in the call establishment in a manner known per se. Thus, the other exchanges are capable of routing the call to the appropriate communication paths based on the TMR. Thus the invention can be used with already existing exchanges, and it is sufficient to only make changes to the first exchange GMSC.

In another preferred embodiment of the exchange of the present invention the exchange is provided with means for subjecting the B-subscriber number to a predetermined conversion selected according to the call type indicated by the basic service code. In this preferred embodiment the first exchange GMSC modifies the B-subscriber number for instance by adding a specific predetermined prefix to the number. This prefix is selected such that the other exchanges which participate in the call establishment of the terminating call are able to select suitable communication paths for the call type based on the prefix.

The preferred embodiments of the method, mobile communication system and exchange of the present invention are disclosed in the accompanying dependent claims 2, 4–6 and 8–9.

Figure 2:
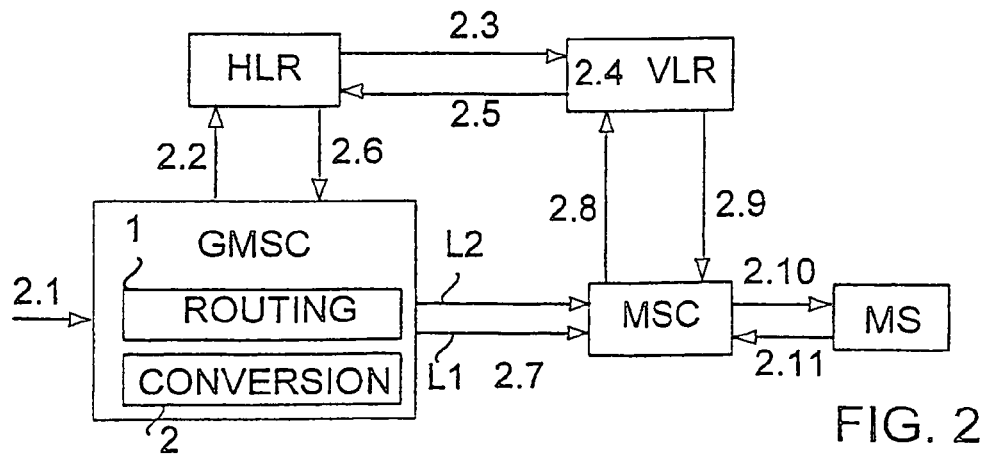
Figure 5:
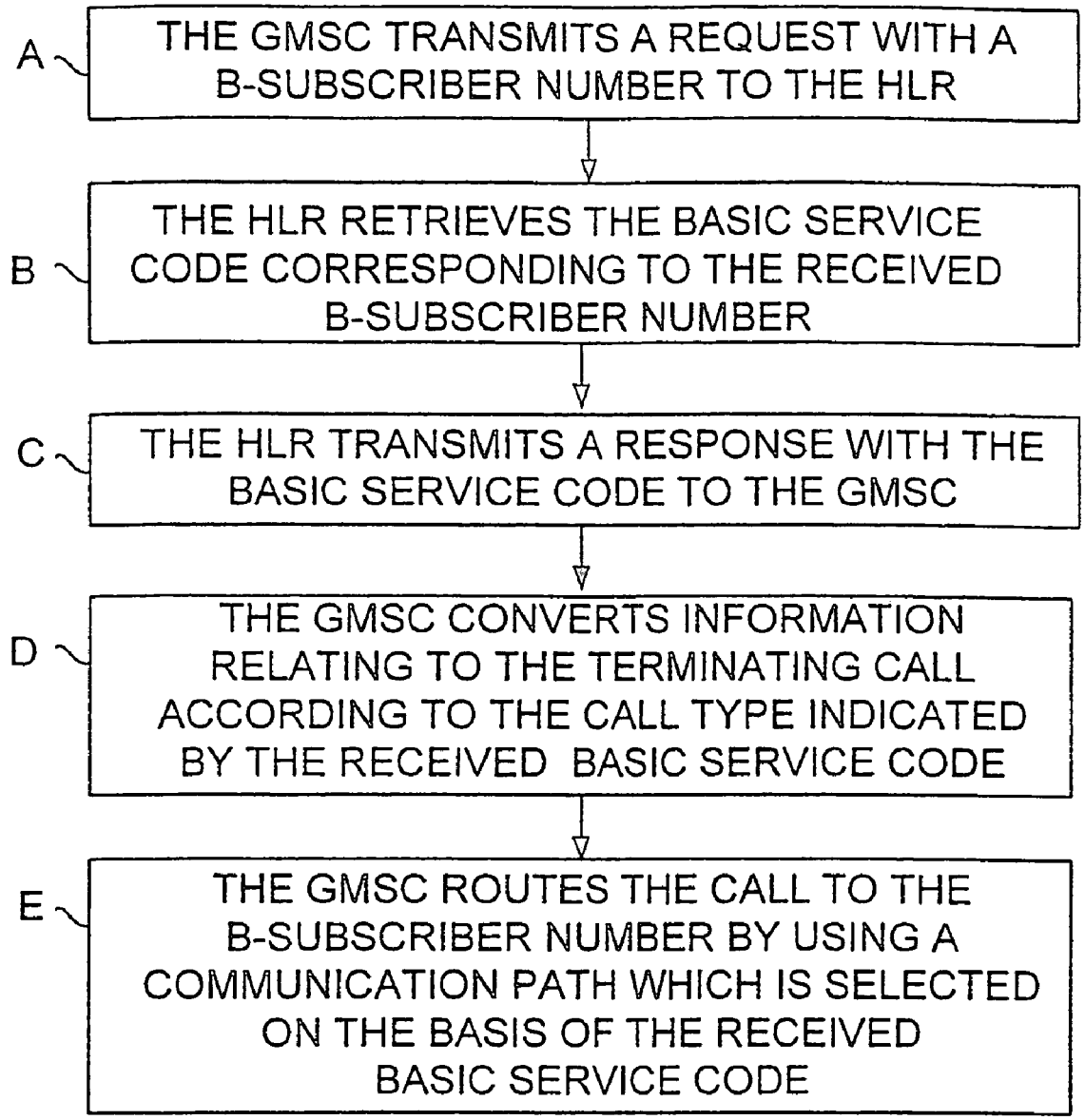

The invention will be described in greater detail in connection with preferred embodiments and with reference to the accompanying drawings, in which FIG. 1 is a block diagram illustrating the basic components of a GSM system, FIG. 2 illustrates the set-up of a call terminating at a mobile station (MS) in a GSM-type mobile system, FIG. 3 illustrates the general implementation of subscriber data in a home location register (HLR), FIG. 4 shows an example of a response from an HLR to an exchange, and FIG. 5 is a flow chart of a first preferred embodiment of the method of the present invention.

The present invention is applicable for use in mobile systems where circuit switched data and speech calls can be set up. The invention can be used especially in a GSM mobile system and in similar more recent mobile systems, such as the GSM 900, GSM1800 and the GSM 1900. In the following, the primary embodiment of the invention will be described in the GSM system, without restricting the invention thereto, however.

FIG. 1 shows the basic components of the GSM system without describing in greater detail their properties or other parts of the system. For a more detailed description of the GSM system, reference is made to the GSM recommendations and The GSM System for Mobile Communications by M. Mouly and M. Pautet, Palaiseau, France, 1992, ISBN: 2-9507190-0-0-7.

A mobile services switching centre MSC manages the switching of incoming and outgoing calls. It carries out similar functions as an exchange in a PSTN. In addition, it also performs functions, such as subscriber location management, that are only characteristic of mobile communication in connection with the network subscriber registers. In a GSM system, the subscriber registers include a home location register HLR and a visitor location register VLR. Subscriber data is stored permanently in the home location register HLR, as well as information on the visitor location register VLR in the area of which the MS is located. The visitor location register VLR in turn stores subscriber data of an MS temporarily while the MS is located in the area of the mobile services switching centre MSC connected to the visitor location register VLR. One visitor location register VLR typically serves one mobile services switching centre MSC. The MSs are connected to the mobile services switching centre MSC via base station systems BSS. A base station system BSS is formed of base station controllers BSC and base stations BTS. One base station controller BSC is used to control several base stations BTS.

FIG. 2 illustrates the formation of a call terminating at a mobile station MS according to the present invention in a GSM-type mobile system utilizing a multi numbering scheme. In step 2.1, a call arrives at a first exchange GMSC of the network, which transmits a routing information request (message 2.2) to the subscriber home location register HLR that is determined according to the subscriber number MSISDN. The routing information request message 2.2 also contains the MSISDN, in other words the B-subscriber number. In location updating, the home location register HLR of the subscriber is provided with updated data about the visitor location register VLR in the area of which the subscriber is located. On the basis of this data, the home location register HLR transmits a roaming number allocation request (message 2.3) to the visitor location register VLR. With the roaming number allocation request the visitor location register VLR also receives an international mobile subscriber identity (IMSI) and the BCIE related to the called MSISDN (or the ISDN BCIE that arrived in the message 2.2), indicating for example the network resources required by the call but not the type of the basic service. The visitor location register VLR stores the BCIE it has received and allocates a mobile station roaming number (MSRN) (event 2.4). The visitor location register VLR transmits the allocated MSRN to the home location register HLR in a response message 2.5.

The Home Location Register comprises a register from which it is able to retrieve the basic service code corresponding to the B-subscriber number included in the request 2.2. The home location register is thus able to transmit a message 2.6 with the roaming number and the basic service code to the exchange GMSC that requested for the routing information. The roaming number space is determined such that a call is always directed to the visited MSC the visitor location register VLR of which has allocated the roaming number.

A routing means 1 of the exchange GMSC uses the information in the response 2.6 for routing the terminating call. In the example of FIG. 2 the routing exchange GMSC is connected by two communication paths or lines L1 and L2 to the exchange MSC. Lines L1 and L2 are assumed to have different properties such that, for instance, line L1 is suitable for data calls and line L2 for ordinary speech calls. The exchange GMSC is able to determine the type of the terminating call which is indicated by the basic service code included in the response 2.6. Thus, if the basic service code indicates that the terminating call is a data call, then the GMSC selects line L1 when it routes the call to the exchange MSC. Correspondingly, if the basic service code indicates that the terminating call is a data call, then the GMSC selects line L1 when it routes the call to the exchange MSC.

The exchange GMSC also comprises conversion means 2, which convert the information relating to the terminating call such that subsequent exchanges of the mobile communication system are able to route the call over the appropriate lines. This can be achieved such that the conversion means convert the Transmission Medium Requirement (TMR) of the terminating call when ISDN signaling (ISUP) is in use. Existing prior art exchanges in mobile communication systems which utilize ISDN signaling are capable of selecting appropriate communication paths based on the TMR. However, an analog PSTN network is not able to provide the GMSC with the correct TMR. Thus, according to the present invention, the exchange GMSC communicates with the HLR register in order to obtain the basic service code of the terminating call, and on the basis of this information it converts the TMR of the terminating call such that the other exchanges of the network are able to use it and to select an appropriate line for the call.

Another alternative for providing information about the call type to the subsequent exchanges is that the conversion means 2 convert the B-subscriber number in a predetermined manner, for instance by adding a prefix to the B-subscriber number. This prefix is selected such that it informs the subsequent exchanges about the call type.

When the exchange GMSC has received the response 2.6, identified the call type and carried out the necessary conversions it transmits an initial message 2.7 to the exchange MSC indicated by the roaming number.

This initial message is transmitted on line L1 or line L2 depending on the call type.

After the exchange MSC has received the initial address message 2.7, it finds during the roaming number analysis that the call is about to terminate in its own area and should not be forwarded. In such a case, the exchange MSC asks for the data of the called subscriber from its own visitor location register VLR for the purpose of call set-up (message 2.8). In a normal situation, the visitor location register VLR returns the required data, including for example the BCIE, in a response message 2.9. If the exchange MSC is capable of providing the data transmission resources indicated by the BCIE, the call set-up signaling illustrated by arrows 2.10 and 2.11 will be carried out between the exchange MSC and the mobile station MS.

As described above, modern mobile systems support different tele- and bearer services. The GSM bearer services are determined in GSM recommendation 02.02 and the teleservices in GSM recommendation 02.03. A separate teleservice and bearer service code is determined for each teleservice and bearer service in recommendation 09.02. For example, the teleservice code of the speech service is 00010001 and the teleservice code of the short messages originating from a mobile station is 00100010. In this specification, all service codes are called basic service codes. One mobile subscriber may have access to different tele- and bearer services, which are referred to in this connection as basic services. As described above, it is preferable to use a multi numbering scheme, where each basic service is allocated an individual MSISDN.

In a GSM system, subscriber services are specified in a subscriber home location register HLR with the other subscriber data. FIG. 3 illustrates the general implementation of subscriber data in the home location register HLR for a subscriber that has access to n basic services. The subscriber has his own IMSI that is used as subscriber identification within the mobile network. The services specified for the subscriber are related to the subscriber IMSI. According to the principle of the multi numbering scheme, each subscriber service 1 to n is given an individual number MSISDN-1 to MSISDN-n. Each MSISDN is related to one basic service code SC-1 to SC-n that determines the service. The basic service code is one of the aforementioned tele- and bearer service codes.

FIG. 4 shows an example of a response (SendRoutinginfoResE, SRI-Res) from an HLR to a request for routing information. In the embodiment described herein, the response message returns the basic service code SC-n ([9] basicService) related to the called party number (B-subscriber number) and stored in the HLR to the exchange that made the routing request. According to the invention, the exchange GMSC identifies the type of the service on the basis of the basic service code and selects a line, in other words a communication path, for routing the call to the B-subscriber number according to the type of call indicated by the basic service code. The communication path is selected such that the exchange selects from several optional lines with different properties, a line that fulfills the property requirements of the call type in question.

FIG. 5 is a flow chart of a first preferred embodiment of the present invention. The flow chart of FIG. 5 can be used for instance in a GSM system where a multi numbering scheme is used.

In block A a first exchange GMSC of a mobile communication system receives information for a call terminating at a mobile subscriber. The call originateds from an analog PSTN network, and thus the GMSC does not receive information which would make it possible to identify the call type. The GMSC transmits a routing request with the B-subscriber number to the Home Location Register HLR of the mobile station in question.

In block B the HLR register retrieves the basic service code corresponding to the B-subscriber number. The HLR also transmits a roaming number request to a VLR register and receives a Mobile Station Roaming Number (MSRN) (as described in more detail in connection with FIG. 2).

In block C the HLR register transmits a response (SendRoutingInfoResE, SRI-Res) to the GMSC. Said response includes the retrieved basic service code of the terminating call.

In block D the GMSC converts the information relating to the terminating call such that subsequent exchanges, which also participate in the routing of the terminating call, are able to route the call on communication paths with appropriate properties for the call type in question. In a system where ISDN signaling (ISUP) is in use, this can be achieved for instance such that the Transmission Medium Requirement (TMR) of the terminating call is converted according to the call type indicated by the basic service code.

In block E the GMSC routes the call to the B-subscriber number by using a communication path with appropriate properties for the call type in question.

It should be understood that the above description and the related drawings are only intended to illustrate the present invention. Thus variations and modifications from the description will be apparent to those skilled in the art without departing from the scope and spirit of the invention disclosed in the attached claims.

What is claimed is:

1. A method of routing a terminating call in a mobile communication system comprising exchanges which are connected to each other by communication paths, and at least one subscriber database containing subscriber data, said method comprising:

transmitting a request from a routing exchange to said subscriber database, said request including at least a B-subscriber number of said terminating call, retrieving a basic service code for said terminating call from said subscriber database on the basis of the B-subscriber number included in the request, transmitting a response from said subscriber database to said routing exchange, said response including at least said basic service code, and routing said terminating call from the routing exchange to said B-subscriber number by using communication paths that fulfill the property requirements of the call type indicated by said basic service code.

2. A method according to claim 1, wherein said subscriber database is a home location register, and said response is a SendRoutingInfoResE message wherein the basic service code is included.

3. A mobile communication system comprising:

at least one subscriber database containing subscriber data, and exchanges connected to each other by communication paths, at least one of said exchanges comprising means for transmitting a request to said subscriber database, said request including at least a B-subscriber number of a terminating call, wherein said subscriber database comprises means for retrieving and transmitting to said exchange a basic service code that corresponds to the B-subscriber number included in the request, and said exchange comprises means for routing said terminating call to the B-subscriber number by using communication paths that fulfill the property requirements of the call type indicated by said basic service code.

4. A mobile communication system according to claim 3, wherein said subscriber database is a home location register, and said response is a SendRoutingInfoResE message wherein the basic service code is included.

5. A mobile communication system according to claim 3, wherein said exchange comprises means for subjecting the B-subscriber number to a predetermined conversion selected according to the call type indicated by the basic service code.

6. A mobile communication system according to claim 3, wherein said exchange comprises means for converting the transmission medium requirement of the terminating call according to the call type indicated by the basic service code.

7. An exchange of a mobile communication system, said exchange comprising:

means for transmitting a request that includes at least a B-subscriber number of a terminating call, and routing means for routing said terminating call, wherein said exchange comprises means for receiving a basic service code, and said routing means are responsive to the received basic service code for routing said terminating call to the B-subscriber number by using a communication path that fulfills the property requirements of the call type indicated by said basic service code.

8. An exchange according to claim 7, wherein said exchange comprises means for subjecting the B-subscriber number to a predetermined conversion selected according to the call type indicated by the basic service code.

9. An exchange according to claim 7, wherein said exchange comprises means for converting the transmission medium requirement of the terminating call according to the call type indicated by the basic service code.

* * * * *